US009102877B2

(12) United States Patent
McNeff et al.

(10) Patent No.: US 9,102,877 B2
(45) Date of Patent: Aug. 11, 2015

(54) SYSTEMS AND METHODS FOR PRODUCING FUELS FROM BIOMASS

(75) Inventors: Clayton V. McNeff, Andover, MN (US); Bingwen Yan, Shoreview, MN (US)

(73) Assignee: SarTec Corporation, Anoka, MN (US)

(*) Notice: Subject to any disclaimer, the term of this patent is extended or adjusted under 35 U.S.C. 154(b) by 985 days.

(21) Appl. No.: 12/617,125

(22) Filed: Nov. 12, 2009

(65) Prior Publication Data

US 2010/0170147 A1    Jul. 8, 2010

Related U.S. Application Data (60) Provisional application No. 61/113,854, filed on Nov. 12, 2008.

(51) Int. Cl.
*C10L 1/182* (2006.01)
*C10B 53/02* (2006.01)
(Continued)

(52) U.S. Cl.
CPC .................. *C10B 53/02* (2013.01); *C10B 19/00* (2013.01); *C10G 1/06* (2013.01); *C10G 3/44* (2013.01); *C10G 29/02* (2013.01); *C10L 1/026* (2013.01); *C10G 2300/1014* (2013.01);
(Continued)

(58) Field of Classification Search
USPC ........ 585/240, 638, 639, 631; 208/75, 76, 77, 208/137; 44/605, 308, 388, 389, 451
See application file for complete search history.

(56) References Cited

U.S. PATENT DOCUMENTS 2,383,632 A    8/1945 Trent
2,679,471 A    5/1954 Ayers et al.
(Continued)

FOREIGN PATENT DOCUMENTS

BR    8202429    11/1983
CN    1680514    10/2005
(Continued)

OTHER PUBLICATIONS

Steven L Suib. New and Future Developments in Catalysis: Catalytic Biomass Conversion. p. 184. ISBN: 978-0-444-538789.*
(Continued)

*Primary Examiner* — In Suk Bullock
*Assistant Examiner* — Sharon Pregler
(74) *Attorney, Agent, or Firm* — Pauly, DeVries Smith & Deffner, L.L.C.

(57) ABSTRACT

The present invention relates to systems and methods for producing fuels. In an embodiment, the invention includes a method of producing a diesel-equivalent fuel, including pyrolyzing biomass to form a pyrolysis oil and contacting the pyrolysis oil and an alcohol with a metal oxide catalyst at a temperature of greater than about 60 degrees Celsius. In an embodiment, the invention includes a method of refining pyrolysis oil including contacting pyrolysis oil and an alcohol with a metal oxide catalyst at a temperature of greater than about 60 degrees Celsius. In an embodiment, the invention includes a system for processing biomass into fuel including a pyrolysis chamber defining an interior volume; a first heating element configured to heat the pyrolysis chamber; a refining chamber in selective fluid communication with the pyrolysis chamber, the refining chamber defining an interior volume, a metal oxide catalyst disposed within the interior volume; and a second heating element configured to heat the refining chamber. Other embodiments are also described herein.

16 Claims, 7 Drawing Sheets

(51) Int. Cl.
*C10B 19/00* (2006.01)
*C10G 1/06* (2006.01)
*C10G 29/02* (2006.01)
*C10L 1/02* (2006.01)
*C10G 3/00* (2006.01)
*C10L 1/19* (2006.01)

(52) U.S. Cl.
CPC . *C10G 2300/203* (2013.01); *C10G 2300/4006* (2013.01); *C10G 2400/04* (2013.01); *C10L 1/19* (2013.01); *Y02E 50/14* (2013.01); *Y02E 50/32* (2013.01)

(56) References Cited

U.S. PATENT DOCUMENTS

| | | | |
|---|---|---|---|
| 3,383,396 | A | 5/1968 | Cahn et al. |
| 4,138,336 | A | 2/1979 | Mendel et al. |
| 4,216,337 | A | 8/1980 | Baba et al. |
| 4,487,933 | A | 12/1984 | Mixan et al. |
| 4,582,589 | A | 4/1986 | Ushizawa et al. |
| 4,716,218 | A | 12/1987 | Chen et al. |
| 4,861,739 | A | 8/1989 | Pellet et al. |
| 4,891,459 | A | 1/1990 | Knight et al. |
| 5,108,597 | A | 4/1992 | Funkenbusch et al. |
| 5,108,897 | A | 4/1992 | Steinetz et al. |
| 5,179,219 | A | 1/1993 | Priegnitz |
| 5,182,016 | A | 1/1993 | Funkenbusch et al. |
| 5,252,762 | A | 10/1993 | Denton et al. |
| 5,254,262 | A | 10/1993 | Funkenbusch et al. |
| 5,271,833 | A | 12/1993 | Funkenbusch et al. |
| 5,298,650 | A | 3/1994 | Waller et al. |
| 5,308,364 | A | 5/1994 | Gutierrez et al. |
| 5,308,365 | A | 5/1994 | Kesling et al. |
| 5,321,197 | A | 6/1994 | Angstadt et al. |
| 5,346,619 | A | 9/1994 | Funkenbusch et al. |
| 5,350,879 | A | 9/1994 | Engel et al. |
| 5,508,457 | A | 4/1996 | Bayense et al. |
| 5,532,392 | A | 7/1996 | Gheorghiu |
| 5,540,834 | A | 7/1996 | Carr et al. |
| 5,859,270 | A | 1/1999 | Kolstad et al. |
| 5,908,946 | A | 6/1999 | Stern et al. |
| 6,090,959 | A | 7/2000 | Hirano et al. |
| 6,211,390 | B1 | 4/2001 | Peter et al. |
| 6,376,701 | B1 | 4/2002 | Chavan et al. |
| 6,392,062 | B1 | 5/2002 | Haas |
| 6,407,269 | B2 | 6/2002 | Kaita et al. |
| 6,433,146 | B1 | 8/2002 | Cheryan |
| 6,489,496 | B2 | 12/2002 | Barnhorst et al. |
| 6,538,146 | B2 | 3/2003 | Turck |
| 6,666,074 | B2 | 12/2003 | Gerner et al. |
| 6,712,867 | B1 | 3/2004 | Boocock |
| 6,719,815 | B2 | 4/2004 | Nanninga et al. |
| 6,768,015 | B1 | 7/2004 | Luxem et al. |
| 6,878,837 | B2 | 4/2005 | Bournay et al. |
| 6,887,283 | B1 | 5/2005 | Ginosar et al. |
| 6,960,672 | B2 | 11/2005 | Nakayama et al. |
| 6,963,004 | B2 | 11/2005 | Ahtchi-Ali et al. |
| 6,965,044 | B1 | 11/2005 | Hammond et al. |
| 6,979,426 | B2 | 12/2005 | Teall et al. |
| 6,982,340 | B2 | 1/2006 | Mumura et al. |
| 7,045,100 | B2 | 5/2006 | Ergun et al. |
| 7,097,770 | B2 | 8/2006 | Lysenko |
| 7,101,464 | B1* | 9/2006 | Pringle .................. 202/113 |
| 7,112,688 | B1 | 9/2006 | Tysinger et al. |
| 7,126,032 | B1 | 10/2006 | Aiken |
| 7,138,536 | B2 | 11/2006 | Bournay et al. |
| 7,145,026 | B2 | 12/2006 | Fleisher |
| 7,151,187 | B2 | 12/2006 | Delfort et al. |
| 7,211,681 | B2 | 5/2007 | Furuta |
| 7,309,592 | B2 | 12/2007 | Offerman et al. |
| 7,312,355 | B2 | 12/2007 | Corma Cans et al. |
| 7,321,052 | B2 | 1/2008 | Miller et al. |
| 7,371,308 | B1 | 5/2008 | Hackl et al. |
| RE40,419 | E | 7/2008 | Norbeck et al. |
| 7,438,785 | B2 | 10/2008 | Meier et al. |
| 7,498,454 | B2 | 3/2009 | Redlingshoefer |
| 7,507,846 | B2 | 3/2009 | Pelly |
| 7,514,575 | B2 | 4/2009 | Ginosar et al. |
| 7,563,915 | B2 | 7/2009 | Matson |
| 7,582,784 | B2 | 9/2009 | Banavali et al. |
| 7,592,470 | B2 | 9/2009 | Lacome et al. |
| 7,601,858 | B2 | 10/2009 | Cantrell et al. |
| 7,666,234 | B2 | 2/2010 | Ghosh et al. |
| 7,678,163 | B2 | 3/2010 | Brummerstedt Iversen et al. |
| 7,696,376 | B2 | 4/2010 | Furuta |
| 7,754,643 | B2 | 7/2010 | Srinivas et al. |
| 7,790,651 | B2 | 9/2010 | Lin et al. |
| 7,851,643 | B2 | 12/2010 | Hillion et al. |
| 7,857,872 | B2 | 12/2010 | Krasutsky et al. |
| 7,880,043 | B2 | 2/2011 | Chapus et al. |
| 7,897,798 | B2 | 3/2011 | McNeff et al. |
| 7,943,791 | B2 | 5/2011 | Mcneff |
| 8,008,516 | B2 | 8/2011 | Cantrell et al. |
| 8,017,796 | B2 | 9/2011 | McNeff et al. |
| 8,022,258 | B2 | 9/2011 | Myllyoja et al. |
| 8,361,174 | B2 | 1/2013 | McNeff et al. |
| 8,466,305 | B2 | 6/2013 | McNeff |
| 8,686,171 | B2 | 4/2014 | McNeff et al. |
| 2001/0042340 | A1* | 11/2001 | Tateno et al. ............... 44/388 |
| 2002/0010359 | A1 | 1/2002 | Kaita et al. |
| 2002/0156305 | A1 | 10/2002 | Turck |
| 2003/0229238 | A1 | 12/2003 | Fleisher |
| 2004/0074760 | A1* | 4/2004 | Portnoff et al. .......... 204/157.15 |
| 2004/0087809 | A1 | 5/2004 | Nakayama et al. |
| 2004/0094477 | A1 | 5/2004 | Lysenko et al. |
| 2005/0064577 | A1 | 3/2005 | Berzin |
| 2005/0080280 | A1 | 4/2005 | Yoo |
| 2005/0118409 | A1 | 6/2005 | McNeff et al. |
| 2005/0137411 | A1 | 6/2005 | Ahtchi-Ali et al. |
| 2005/0204612 | A1 | 9/2005 | Connemann et al. |
| 2005/0239182 | A1 | 10/2005 | Berzin |
| 2005/0260553 | A1 | 11/2005 | Berzin |
| 2005/0261509 | A1 | 11/2005 | Delfort et al. |
| 2005/0266139 | A1 | 12/2005 | Lacome et al. |
| 2005/0274065 | A1 | 12/2005 | Portnoff et al. |
| 2006/0014974 | A1 | 1/2006 | Bournay et al. |
| 2006/0041152 | A1 | 2/2006 | Cantrell et al. |
| 2006/0041153 | A1 | 2/2006 | Cantrell et al. |
| 2006/0080891 | A1 | 4/2006 | Ghosh et al. |
| 2006/0149087 | A1 | 7/2006 | Furuta |
| 2006/0224005 | A1 | 10/2006 | Felly |
| 2006/0252950 | A1 | 11/2006 | Ginosar et al. |
| 2006/0260186 | A1 | 11/2006 | Iversen et al. |
| 2006/0288636 | A1 | 12/2006 | Iijima et al. |
| 2007/0010682 | A1 | 1/2007 | Myllyoja et al. |
| 2007/0027338 | A1 | 2/2007 | Furuta |
| 2007/0037994 | A1 | 2/2007 | Canos et al. |
| 2007/0066838 | A1 | 3/2007 | Hillion et al. |
| 2007/0089356 | A1 | 4/2007 | Krasutsky et al. |
| 2007/0093380 | A1 | 4/2007 | Srinivas et al. |
| 2007/0137097 | A1* | 6/2007 | Ikura ............................ 44/308 |
| 2007/0196892 | A1 | 8/2007 | Winsness et al. |
| 2007/0238905 | A1 | 10/2007 | Arredondo et al. |
| 2007/0283619 | A1 | 12/2007 | Hillion et al. |
| 2008/0051592 | A1 | 2/2008 | McNeff et al. |
| 2008/0161615 | A1 | 7/2008 | Chapus |
| 2008/0188676 | A1 | 8/2008 | Anderson et al. |
| 2008/0197052 | A1 | 8/2008 | McNeff et al. |
| 2008/0318763 | A1 | 12/2008 | Anderson |
| 2009/0029445 | A1 | 1/2009 | Eckelberry et al. |
| 2009/0227823 | A1* | 9/2009 | Huber et al. ............... 585/324 |
| 2009/0281056 | A1 | 11/2009 | Mori et al. |
| 2010/0087670 | A1 | 4/2010 | Wang et al. |
| 2010/0147771 | A1 | 6/2010 | McNeff et al. |
| 2010/0170143 | A1 | 7/2010 | McNeff et al. |
| 2010/0170147 | A1 | 7/2010 | McNeff et al. |
| 2010/0191004 | A1 | 7/2010 | McNeff et al. |
| 2011/0060153 | A1 | 3/2011 | McNeff et al. |
| 2011/0172450 | A1 | 7/2011 | McNeff et al. |

(56) References Cited

U.S. PATENT DOCUMENTS

| | | | |
|---|---|---|---|
| 2011/0184201 | A1 | 7/2011 | McNeff |
| 2013/0345457 | A1 | 12/2013 | McNeff |

FOREIGN PATENT DOCUMENTS

| | | |
|---|---|---|
| CN | 1718679 | 1/2006 |
| CN | 1858160 | 11/2006 |
| CN | 1887417 | 1/2007 |
| CN | 1928016 | 3/2007 |
| DE | 102005038137 | 2/2007 |
| EP | 0198243 | 10/1986 |
| EP | 0507217 | 10/1992 |
| EP | 0535290 | 4/1993 |
| EP | 1505048 | 2/2005 |
| EP | 1580255 | 9/2005 |
| EP | 1607467 | 12/2005 |
| EP | 1681281 | 7/2006 |
| FR | 2188612 | 1/1974 |
| FR | 2679471 | 1/1993 |
| FR | 2890656 | 3/2007 |
| GB | 2132222 | 7/1984 |
| JP | 6313188 | 11/1994 |
| JP | 11228494 | 8/1999 |
| JP | 2005126346 | 5/2005 |
| JP | 2005177722 | 7/2005 |
| JP | 2007153943 | 6/2007 |
| JP | 2007190450 | 8/2007 |
| JP | 2008111085 | 5/2008 |
| WO | WO-0005327 | 2/2000 |
| WO | WO-03/062358 | 7/2003 |
| WO | WO-03/087279 | 10/2003 |
| WO | WO-03094598 | 11/2003 |
| WO | WO-2004/085585 | 10/2004 |
| WO | WO-2004096962 | 11/2004 |
| WO | WO-2005/000782 | 1/2005 |
| WO | WO-2005/021697 | 3/2005 |
| WO | WO-2005/035479 | 4/2005 |
| WO | WO-2005/093015 | 10/2005 |
| WO | WO-2005/123890 | 12/2005 |
| WO | WO-2006/070661 | 7/2006 |
| WO | WO-2006/081644 | 8/2006 |
| WO | WO-2006/088254 | 8/2006 |
| WO | WO-2006/093896 | 9/2006 |
| WO | WO-2006/094986 | 9/2006 |
| WO | WO-2007/011343 | 1/2007 |
| WO | WO-2007/012190 | 2/2007 |
| WO | WO-2007/025360 | 3/2007 |
| WO | WO-2007/029851 | 3/2007 |
| WO | WO-2007/038605 | 4/2007 |
| WO | WO-2007/043062 | 4/2007 |
| WO | WO-2007072972 | 6/2007 |
| WO | WO-2007077950 | 7/2007 |
| WO | WO-2007111604 | 10/2007 |
| WO | WO-2007140395 | 12/2007 |
| WO | WO-2007141293 | 12/2007 |
| WO | WO-2007142983 | 12/2007 |
| WO | WO-2008012275 | 1/2008 |
| WO | WO-2008019325 | 2/2008 |
| WO | WO-2008/034109 | 3/2008 |
| WO | WO-2008029132 | 3/2008 |
| WO | WO-2008041038 | 4/2008 |
| WO | WO-2008101032 | 8/2008 |
| WO | WO-2009002880 A1 | 12/2008 |
| WO | WO-2009007234 | 1/2009 |
| WO | WO-2009007234 A1 | 1/2009 |
| WO | WO-2010144597 | 12/2010 |

OTHER PUBLICATIONS

File History in co-pending U.S. Appl. No. 12/030,801, Entitled "Devices and Methods for Selective Removal of Contaminants from a Composition" (pp. 1-237).
International Search Report and Written Opinion from International Application No. PCT/US2008/053883, mailed Jul. 9, 2008 (pp. 1-13).
PCT International Search Report and Written Opinion from International Application No. PCT/US2007/075211, mailed Jul. 9, 2008 (pp. 1-14).
"EP Communication, EPO form 2906 01.91TRI, from the European Patent Office in EP Patent Application No. 07840692.3, corresponding to U.S. Appl. No. 11/833,839, mailed Dec. 11, 2009, (pp. 1-4)".
"EP Communication, EPO form 2906 01.91TRI, from the European Patent Office in EP Patent Application No. 08729792.5, corresponding to U.S. Appl. No. 12/030,801, mailed Mar. 2, 2010, (pp. 1-4)".
"File History for co-pending U.S. Appl. No. 12/238,750, "Methods and Compositions for Refining Lipid Feed Stocks," (168 pages)".
"Kyte Centrifuge Sales & Consulting", www.kcentrifuqe.com, p. 1.
"PCT International Search Report and Written Opinion from International Application No. PCT/US2010/038000, corresponding to U.S. Appl. No. 12/797393, mailed Oct. 4, 2010, pp. 1-13".
"PCT Notification Concerning Transmittal of Copy of International Preliminary Report on Patentability", From International Application No. PCT/US2007/075211, corresponding to U.S. Appl. No. 11/833,839, mailed Feb. 19, 2009, pp. 1-9.
"PCT Notification Concerning Transmittal of Copy of International Preliminary Report on Patentability", From International Application No. PCT/US2008053883, corresponding to U.S. Appl. No. 12/030,801, mailed Aug. 27, 2009, pp. 1-9.
"Response to European Communication pursuant to Article 94 (3) Epc, dated Dec. 11, 2009, Filed in the European Patent Office on Jun. 16, 2010 for EP Patent Application No. 07840692.3, corresponding to U.S. Appl. No. 11/833,839, (1-12)".
Annen, et al., "Development of Porous Zirconia Spheres by Polymerization-Induced Colloid Aggregation-Effect of Polymerization Rate", *Journal of Mater. Sci.*, 29(23):6123-6130 (1994).
Anon, , "Beatrice Biodiesel Selects Axens Exterfip-H Technology", *Biodiesel Magazine* Jun. 2006 , Unknown.
BCC Research, "Global Market for Catalyst Regeneration", MarketResearch.com http://www.marketresearch.com/product/display.asp?productid=1354464 2006 , 1-20.
Blackwell, J. A. et al., "A Chromatographic Study of the Lewis Acid-Base Chemistry of Zirconia Surfaces", *J. Liquid Chromatog.* 1991 , 14: 2875-2889.
Blackwell, J. A. et al., "Study of the Fluoride Adsorption Characterisitics of Porous Microparticulate Zirconium Oxide", *J. Chromatog.* 1991 , 549: 43-57.
Bournay, L. et al., "New Heterogeneous Process for Biodiesel Production: A Way to Improve the Quality and the Value of the Crude Glycerin Produced by Biodiesel Plants", *Catalysis Today* 2005 , 106: 190-192.
Brown, Adrian S. et al., "Sulfated Metal Oxide Catalysts: Superactivity through Superacidity?", *Green Chemistry* Feb. 1999 , 17-20.
Bryan, Tom , "Adsorbing It All", *Biodiesel Magazine* Mar. 2005 , 40-43.
Cao, W. et al., "Preparation of Biodiesel from Soybean Oil Using Supercritical Methanol and Co-Solvent", *Fuel* 2005 , 84: 347-351.
Collins, K. , "Statement of Keith Collins, Chief Economist, U.S. Department of Agriculture before the U.S. Senate Committee on Appropriations, Subcommittee on Agriculture, Rural Development, and Related Agencies: Economic Issues Related to Biofuels.", *Unknown* www.usda.gov/documents/Farmbill07energy.doc. Aug. 26, 2006 , 1-8 (web).
Dean, Morgan et al., "Nanocrystalline Metal Oxide-Based Catalysts for Biodiesel Production from Soybean Oil", #96—*Student Poster Session: Catalysis & Reaction Engineering* (04016) http://aiche.confex.com/aiche/2006/techprogram/P78366.HTM Nov. 13, 2006 , 1 (web).
Demirbas, Ayhan , "Biodiesel fuels from vegetable oils via catalytic and non-catalytic supercritical alcohol transesterifications and other methods: a survey", *Energy Conversion & Management* 2003 , issue 44 pp. 2093-2109.
Di Serio, et al., "Synthesis of Biodiesel via Homogeneous Lewis Acid Catalyst", *J. Molec. Catal. A Chem.* 2005 , 239: 111-115.
Di Serio, M. et al., "Transesterification of Soybean Oil to Biodiesel by Using Heterogeneous Basic Catalysts", *Ind. Eng. Chem. Res.* 2006 , 45: 3009-3014.
Dorsa, Renato et al., "Basics of Alkali Refining of Vegetable Oils", *GEA Westfalia Separator Food Tec GmbH* Unknown , 1-28.

(56) References Cited

OTHER PUBLICATIONS

Dunlap, C. J. et al., "Zirconia Stationary Phases for Extreme Separations", *Anal. Chem.* 2001, 73: 598A-607A.

Elliott, Brian, "Low-cost Biodiesel Production Process Using Waste Oils and Fats", U.S. EPA SBIR Phase I Kick-Off Meeting www.iastate.edu/Inside/2003/0613/biorenewable.jpg Apr. 5, 2007, 1.

Fabbri, D. et al., ""Dimethyl carbonate as anovel methylating reagent for fatty acidsin analytical pyrolysis"", *Journal of Chromatography, Elsevier Science Publishers B.V, NL LNKDDOI:. 10.1016/J.Chroma. 2004.12.077* Feb. 18, 2005.

Furuta, S. et al., "Biodiesel Fuel Production with Solid Superacid Catalysis is Fixed Bed Reactor Under Atmospheric Pressure", *Catalysis Communications* 2004, 5: 721-723.

Gercel, H. F. et al., "Hydropyrolysis of Extracted Euphorbia rigida in a Well-Swept Fixed-Bed Tubular Reactor", *Energy Sources* 2002, 24: 423-430.

Goering, C. E. et al., "Fuel Properties of Eleven Vegetable Oils", *Trans ASAE* 1982, 25: 1472-1477.

Goodwin, J. G., "Research Activities: Biodiesel Synthesis", *Chemical and Biomolecular Engineering at Clemson University* http://www.ces.clemson.edu/chemeng/facultypages/goodwin/research.html 2006, 1-5.

Haas, M. J. et al., "Engine Performance of Biodiesel Fuel Prepared from Soybean Soapstack: A High Quality Renewable Fuel Produced from a Waste Feedstock", *Energy Fuels* 2001, 15: 1207-1212.

Haas, M. J. et al., "Improving the Economics of Biodiesel Production Through the Use of Low Value Lipids as Feedstocks: Vegetable Oil soapstock", *Fuel Process. Technol.* 2005, 86: 1087-1096.

Harvey, A. P. et al., "Process Intensification of Biodiesel Production Using a Continuous Oscillatory Flow Reactor", *J. Chem. Technol. Biotechnol.* 2003, 78: 338-341.

He, Chen et al., "Biodiesel from Transesterification of Cotton Seed Oil by Solid Bases Catalysis", *Journal of Chemical Engineering of Chinese Universities* Aug. 2006, No. 4 vol. 20.

He, Chen et al., "Biodiesel Production by the transesterification of cottonseed oil by solid acid catalysts", *Frontiers of Chemical Engineering in China* Feb. 2006, vol. 1, No. 1, pp. 1673-7369.

Henry, R. A. et al., "A Novel Chemical Route to Stable, Regenerable Zirconia-Based Chiral Stationary Phases for HPLC", *American Laboratory (News Edition)* 2005, 37: 22-24.

Heyerdahl, Petter H. et al., "Hydrothermal Treatment and Microwave Assisted Pyrolysis of Biomass for Bio-fuel Production-Progress Report", *Presentation at UMB and UMN* 2006, pp. 1-45.

Hill, J. et al., "Environmental, Economic, and Energetic Costs and Benefits of Biodiesel and Ethanol Biofuels", *PNAS* 2006, 103(30): 11206-11210.

Iijima, Wataru et al., ""Winterized" Bio-Diesel Fuel Produced from Animal Fat", *Agro-Energy Laboratory, Dept. of Farm Mechanization and Engineering,National Agricultural ResearchCentre, National Agricultural Research Organization, Japan* Unknown, 1-2.

Iijima, Wataru et al., "The Non-glycerol Process of Biodiesel Fuel Treated in Supercritical Methanol (Abstract)", *Paper No. 046073, 2004 ASAE Annual Meeting* 2004, 1.

Ishihara, K. et al., "Direct Ester Condensation from a 1:1 Mixture of Carboxylic Acids and Alcohols Catalyzed by Hafnium (IV) or Zirconium (IV) Salts.", *Tetrahedron* 2002, 58: 8179-8188.

Kahn, A., "Research into Biodiesel Catalyst Screening and Development", *Thesis, University of Queensland Brisbane* 2002, 1-41.

Kiss, Anton A. et al., "Solid Acid Catalysts for Biodiesel Production—Towards Sustainable Energy", *Adv. Synth. Catal.* 2006, 348: 75-81.

Knothe, G., "Analytical Methods Used in the Production and Fuel Quality Assessment of Biodiesel", *Transactions of the ASAE* 2001, 44(2): 193-200.

Knothe, Gerhard et al., "Bidiesel: The Use of Vegetable Oils and Their Derivatives as Alternative Diesel Fuels", *Oil Chemical Research, National Center For Agricultural Utilization Research, Agricultural Research Service, U.S. Department of Agriculture, Peoria, IL 61604* Unknown, 1-36.

Koh, Ashley D., "Non-Catalytic Biodiesel Production from Soybean Oil Using Supercritical Methanol", *The 2006 Annual Meeting San Francisco, CA* http://aiche.confex.com/aiche/2006/techprogram/P69978.HTM presented Nov. 15, 2006, 1.

Kulkarni, Mangesh G. et al., "Solid Acid Catalyxed Biodiesel Production by Simultaneous Esterification and Transesterification", *Green Chem.* 2006, 8: 1056-1062.

Kulkarni, M. et al., "Waste Cooking Oil: An Economical Source for Biodiesel", *Ind. Eng. Chem. Res.* 2006, 45: 2901-2913.

Liu, Yijun et al., "Transesterification of Poultry Fat with Methanol Using Mg-Al Hydrotalcite Derived Catalysts", *Applied Catalysis A: General* (Abstract only) 2007, vol. 331, 138-148.

Lopez, Dora E. et al., "Esterification and transesterification on tungstated zirconia: Effect of calcination temperature", *Journal or Catalysis* Apr. 1, 2007, vol. 247, Iss. 1, 43-50.

Lopez, D.E. et al., "Transesterification of Triacetin with Methanol on Solid Acid and Base Catalysts", *Appl. Catalysis A: General* 2005, 295: 97-105.

Lotero, E. et al., "Synthesis of Biodiesel Via Acid Catalysis", *Ind. Eng. Chem. Res.* 2005, 44:5353-5363.

Ma, R et al., "Biodiesel Production: A Review", *Bioresource Technol.* 1999, 70:1-15.

Miller, Dennis J. et al., "Catalysis for Biorenewables Conversion", *National Science Foundation Workshop Report* www.egr.msu.edu/apps/nsfworkshop Apr. 13, 2004, 1-63 (web).

Mittelbach, Martin et al., "Diesel Fuel Derived from Vegetable Oils, III. Emission Tests Using Methyl Esters of Used Frying Oil", *JAOCS* Jul. 1988, vol. 65, No. 7, 1185-1187.

Nawrocki, J. et al., "Chemistry of Zirconia and Its Use in Chromatography", *J. Chromatog.* 1993, A 657: 229-282.

Omota, F. et al., "Fatty Acid Esterification by Reactive Distillation: Part 2-13 Kinetics-based Design for Sulphated Zirconia Catalysts", *Chemical Engineering Science* 2003, 58: 3175-3185.

Ondrey, G., "Biodiesel Production Using a Heterogeneous Catalyst", *Chemical Engineering* 2004, 111(11):13.

Otera, J., "Transesterification", *Chem. Rev.* 1993, 93:1449-1470.

Peterson, C. L. et al., "Continuous Flow Biodiesel Production", *Appl. Eng. Agricul.* 2002, 18: 5-11.

Pinto, A. C. et al., "Biodiesel: An Overview", *J. Braz. Chem. Soc.* 2005, 16: 1313-1330.

Pruszko, R., "Strategic Biodiesel Decisions", *Iowa State University-University Extension CIRAS* 2006, 1-32.

Raddi De Araujo, Lucia R. et al., "H3PO4/A1203 Catatysts: Characterization and Catalytic Evaluation of Oleic Acid Conversion to Biofuels and Biolubricant", *Materials Research* 2006, vol. 9, No. 2, 181-184.

Reisch, Marc S., "Start-up Firms Pursue Biofuels", *Chemical & Engineering News* Nov. 20, 2006, vol. 84, No. 47, 1-2(web).

Rigney, M. P. et al., "Physical and Chemical Characterization of Microporous Zirconia", *J. Chromatog* 1990, 499: 291-304.

Robichaud, Michael J. et al., "An Improved Oil Emulsion Synthesis Method for Large, Porous Zirconia Particles for Packed- or Fluidized-Bed Protein Chromatography", *Separation Science and Technology* 1997, 32(15), pp. 2547-2559.

Ruan, Roger et al., "Size matters: small distributed biomass energy production systems for economic viability", *Int J Agric & Biol Eng* Aug. 2008, vol. 1 No. 1, pp. 64-68.

Schuchardt, Ulf et al., "Transesterification of Vegetable Oils: a Review", *J. Braz. Chem. Soc.* 1998, vol. 9, No. 1, 199-210.

Silva, Lisa et al., "Colorado Diesel School Bus Retrofit Program", *A Cooperative Effort of the Regional Air Quality Council and the Colorado Department of Public Health and Environment* 2006, 1-17.

Suppes, G. J. et al., "Transesterification of Soybean Oil with Zeolite and Metal Catalysts", *Applied Catalysis A: General* 2004, 257: 213-223.

Suwannakarn, Kaewta et al., "A comparative study of gas phase esterification on solid acid catalysts", *Catalysis Letters* Apr. 2007, vol. 114, Nos. 3-4, 1-7.

Tyson, K. S., "Brown Grease Feedstocks for Biodiesel", *National Renewable Energy Laboratory* Jun. 19, 2002, 1-34.

Unknown, "AMBERLITEtm FP Ion Exchange Resins", *Amberlite FP technical bulletin* http://www.advancedbiosciences.com Dec. 2004, 1-7.

(56) References Cited

OTHER PUBLICATIONS

Unknown, et al., "Oak Ridge lab develops materials for biodiesel catalysis", *Biodiesel Magazine* http://biodieselmagazine.com/article-print.jsp?article_id=1580 2007, 1.

Unknown, "Standard Test Method for Acid Number of Petroleum Products by Potentiometric Titration", *ASTM International, Designation: D664-04* Mar. 2004, 1-7.

Verkade, J. G. et al., "Nanoporous Solid Catalysts for Conversion of Soybean Oil to Biodiesel", *Center for Catalysis, Iowa State University* http://www.iprt.iastate.edu/ccat/nano.html Feb. 22, 2006, 1-4.

Vieitez, Ignacio et al., "Continuous Production of Soybean Biodiesel in Supercritical Ethanol-Water Mixtures", *American Chemical Society, Energy & Fuels* Jun. 17, 2008, pp. 1-5.

Xie, W. et al., "Synthesis of Biodiesel from Soybean Oil Using Heterogeneous KF/ZnO Catalyst", *Catalyst Letters* Feb. 2006, 107: 53-59.

Yokoyama, Shin-Ya et al., "Liquid Fuel Production from Ethanol Fermentation Stillage", *Chemistry Letters* 1986, pp. 649-652.

Yu, Fei et al., "Liquefaction of Corn Cobs with Supercritical Water Treatment", *American Society of Agricultural and Biological Engineers* 2007, vol. 50(1):175-180.

Yu, Fei et al., "Liquefaction of Corn Stover and Preparation of Polyester from the Liquefied Polyol", *Applied Biochemistry and Biotechnology* 2006, vol. 129-132, pp. 574-585.

Yu, Fei et al., "Physical and Chemical Properties of Bio-Oils From Microwave Pyrolysis of Corn Stover", *Applied Biochemistry and Biotechnology* 2007, vol. 136-140, pp. 957-970.

Yu, Fei et al., "Reaction Kinetics of Stover Liquefaction in Recycled Stover Polyol", *Applied Biochemistry and Biotechnology* 2006, vol. 129-132 pp. 563-573.

Zhang, P., "A New Process for Biodiesel Production Based on Waste Cooking Oils and Heterogeneous Catalysts", *USDA-SBIR Agreement* #2005-33610-15497 2005, 1-2.

"Non-Final Office Action", mailed Mar. 30, 2012 in co-pending U.S. Appl. No. 12/987,751, "Methods and Apparatus for Producing Alkyl Esters From Lipid Feed Stocks and Systems Including Same" (32 pages).

"Non-Final Office Action", mailed Sep. 1, 2011 in co-pending U.S. Appl. No. 13/080,507, "Methods and Compositions for Refining Lipid Feed Stocks" (5 pages).

"Non-Final Office Action", mailed Sep. 20, 2011 in co-pending U.S. Appl. No. 12/987,751, "Methods and Apparatus for Producing Alkyl Esters From Lipid Feed Stocks and Systems Including Same" (5 pages).

"Non-Final Office Action", mailed Mar. 8, 2012 in co-pending U.S. Appl. No. 12/575,198, "Catalysts, Systems, and Methods for Producing Fuels and Fuel Additives From Polyols" (33 pages).

"Non-Final Office Action", mailed Aug. 28, 2012 in U.S. Appl. No. 13/080,507, "Methods and Compositions for Refining Lipid Feed Stocks" (29 pages).

"Response to Non-Final Office Action", mailed Mar. 30, 2012, in co-pending U.S. Appl. No. 12/987,751, filed with USPTO Oct. 1, 2012, (7 pages).

"Response to Non-Final Office Action", mailed Feb. 1, 2012 in co-pending U.S. Appl. No. 13/080,507, filed with USPTO Feb. 1, 2012 (7 pages).

"Response to Non-Final Office Action", mailed Mar. 8, 2012 in co-pending U.S. Appl. No. 12/575,198, "Catalysts, Systems, and Methods for Producing Fuels and Fuel Additives From Polyols" Filed with USPTO Aug. 8, 2012 (10 pages).

"Response to Non-Final Office Action", mailed Sep. 20, 2011, in co-pending U.S. Appl. No. 12/987,751, filed with USPTO Feb. 21, 2012, (8 pages).

Melero, Juan A. et al., "Acidic Mesoporous Silica for the Acetylation of Glycerol: Synthesis of Bioadditives to Petrol Fuel", *Energy & Fuels* 2007, 21: pp. 1782-1791.

Pariente, Stephane et al., "Etherification of glycerol with ethanol over solid acid catalysts", 2008, Green Chem., 11, 1256-1261.

"Final Office Action", mailed Jan. 3, 2013 in co-pending U.S. Appl. No. 12/987,751, "Methods and Apparatus for Producing Alkyl Esters From Lipid Feed Stocks and Systems Including Same," (10 pages).

"Non-Final Office Action", from U.S. Appl. No. 12/987,751, mailed Apr. 17, 2013, 7 pages.

"Notice of Allowance", for U.S. Appl. No. 13/080,507 mailed Feb. 20, 2013, 8 pages.

"Office Action", from CA Application No. 2660049, mailed Jun. 28, 2013, 2 pages.

"Response to Final Office Action", mailed Jan. 3, 2013 in co-pending U.S. Appl. No. 12/987,751, filed with USPTO Apr. 3, 2013 (6 pages).

"Response to Non-Final Office Action", mailed Apr. 17, 2013, in co-pending U.S. Appl. No. 12/987,751, filed with USPTO Sep. 17, 2013, 7 pages.

Notice of Allowance, for U.S. Appl. No. 12/987,751, mailed Nov. 14, 2013 (9 pages).

"Office Action", for CA Application No. 2660049, mailed May 8, 2014 (2 pages).

"Response to Office Action", for Canadian Patent Application No. 2,660,049, mailed May 8, 2014 and filed with the CIPO Nov. 6, 2014 (5 pages).

Non Final Office Action, for U.S. Appl. No. 13/909,885, mailed on Dec. 19, 2014 (37 pages).

\* cited by examiner

SYSTEMS AND METHODS FOR PRODUCING FUELS FROM BIOMASS

This application claims the benefit of U.S. Provisional Application No. 61/113,854, filed Nov. 12, 2008, the contents of which are herein incorporated by reference.

FIELD OF THE INVENTION

The present invention relates to systems and methods for producing fuels from biomass.

BACKGROUND OF THE INVENTION

Pyrolysis is the chemical decomposition of organic materials by heating in the absence of oxygen or other reagents (other than water vapor in some cases). Pyrolysis can be used to convert complex materials such as biomass or waste into substances that are either desirable or less harmful. For example, pyrolysis can be used to convert biomass (such as lignocellulosic biomass) into pyrolysis oil (sometimes referred to as "bio-oil").

Pyrolysis oil is generally a mixture of water, light volatiles, and non-volatiles. Pyrolysis oil is highly reactive because of the presence of significant quantities of oxygen. As a combustible material, pyrolysis oil has many potential uses.

However, pyrolysis oil cannot be used as a fuel in internal combustion engines without further processing. Amongst other problems, pyrolysis oil is generally immiscible with petroleum-based diesel fuel. Also, the pyrolysis oil is highly acidic, with a pH of 1.5-3.8. This acidity, and along with the substantial water content, can lead to corrosion problems. In addition, the cetane number of pyrolysis oil is typically far too low.

Current approaches for utilizing pyrolysis oil in diesel engines include the formation of pyrolysis oil/diesel emulsions. However, such emulsions can be relatively expensive to make and may not have desirable levels of shelf-stability.

SUMMARY OF THE INVENTION

The present invention relates to systems and methods for producing fuels from biomass. In an embodiment, the invention includes a method of producing a diesel-equivalent fuel, including pyrolyzing biomass to form a pyrolysis oil and contacting the pyrolysis oil and an alcohol with a metal oxide catalyst at a temperature of greater than about 60 degrees Celsius.

In an embodiment, the invention includes a method of refining pyrolysis oil including contacting pyrolysis oil and an alcohol with a metal oxide catalyst at a temperature of greater than about 60 degrees Celsius.

In an embodiment, the invention includes a system for processing biomass into fuel including a pyrolysis chamber defining an interior volume; a first heating element configured to heat the pyrolysis chamber; a refining chamber in selective fluid communication with the pyrolysis chamber, the refining chamber defining an interior volume, a metal oxide catalyst disposed within the interior volume; and a second heating element configured to heat the refining chamber.

The above summary of the present invention is not intended to describe each discussed embodiment of the present invention. This is the purpose of the figures and the detailed description that follows.

BRIEF DESCRIPTION OF THE FIGURES

The invention may be more completely understood in connection with the following drawings, in which:

FIG. 6B is a graph showing the results of GC-MS analysis of a product sample produced as described in example 3.

FIG. 6C is a graph showing the results of GC-MS analysis of a product sample produced as described in example 3.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

As described above, pyrolysis oil can be formed from biomass. However, the resulting pyrolysis oil cannot be used as fuel with diesel engines. It suffers from various defects including immiscibility with petroleum-based diesel fuel, highly acidity (e.g., low pH), substantial water content, a cetane number that is typically far too low, and the presence of various particulate products (including char).

However, as disclosed herein, it has been discovered that certain metal oxide catalysts can be used in order to process pyrolysis oil into a form suitable for use as fuel in a diesel engine. In an embodiment, the invention includes a method of producing a diesel-equivalent fuel, including pyrolyzing biomass to form a pyrolysis oil and contacting the pyrolysis oil and an alcohol with a metal oxide catalyst at a temperature of greater than about 100 degrees Celsius.

The term "diesel equivalent fuel" as used herein shall specifically include liquid compositions that can be used as fuel in diesel-type internal combustion engines that are derived from sources other than petroleum. Such liquid compositions can be used in diesel-type engines either in a pure form or as part of mixture. Various aspects of exemplary embodiments will now be described in greater detail.

Metal Oxide Catalysts

Metal oxide catalysts used with embodiments of the invention can include metal oxides with surfaces including Lewis acid sites, Lewis base sites, Brönsted base sites, and Brönsted acid sites. By definition, a Lewis acid is an electron pair acceptor and a Lewis base in an electron pair donor. A Brönsted base is a proton acceptor and a Brönsted acid is a proton donor. Metal oxide catalysts of the invention can specifically include zirconia, alumina, titania and hafnia. Metal oxide catalysts of the invention can also include silica clad with a metal oxide selected from the group consisting of zirconia, alumina, titania, hafnia, zinc oxide, copper oxide, magnesium oxide and iron oxide. In some embodiments, the metal oxides are used in a substantially pure form, unmixed with other metal oxides. However, metal oxide catalysts of the invention can also include mixtures of metal oxides, such as mixtures of metal oxides including zirconia, alumina, titania and/or hafnia. Of the various metal oxides that can be used with embodiments of the invention, zirconia, titania and hafnia can be advantageous as they are very chemically and thermally stable and can withstand very high temperatures and pressures as well as extremes in pH.

Metal oxides of the invention can include metal oxide particles clad with carbon. Carbon clad metal oxide particles can be made using various techniques such as the procedures described in U.S. Pat. Nos. 5,108,597; 5,254,262; 5,346,619; 5,271,833; and 5,182,016, the contents of which are herein incorporated by reference. Carbon cladding on metal oxide particles can render the surface of the particles more hydrophobic.

Metal oxides of the invention can also include polymer coated metal oxides. By way of example, metal oxides of the invention can include a metal oxide coated with polybutadiene (PBD). Polymer coated metal oxide particles can be made using various techniques such as the procedure described in Example 1 of U.S. Pub. Pat. App. No. 2005/0118409, the contents of which are herein incorporated by reference. Polymer coatings on metal oxide particles can render the surface of the particles more hydrophobic.

Metal oxide catalysts of the invention can be made in various ways. As one example, a colloidal dispersion of zirconium dioxide can be spray dried to produce aggregated zirconium dioxide particles. Colloidal dispersions of zirconium dioxide are commercially available from Nyacol Nano Technologies, Inc., Ashland, Mass. The average diameter of particles produced using a spray drying technique can be varied by changing the spray drying conditions. Examples of spray drying techniques are described in U.S. Pat. No. 4,138,336 and U.S. Pat. No. 5,108,597, the contents of both of which are herein incorporated by reference. It will be appreciated that other methods can also be used to create metal oxide particles. One example is an oil emulsion technique as described in Robichaud et al., Technical Note, "An Improved Oil Emulsion Synthesis Method for Large, Porous Zirconia Particles for Packed- or Fluidized-Bed Protein Chromatography," Sep. Sci. Technol. 32, 2547-59 (1997). A second example is the formation of metal oxide particles by polymer induced colloidal aggregation as described in M. J. Annen, R. Kizhappali, P. W. Carr, and A. McCormick, "Development of Porous Zirconia Spheres by Polymerization-Induced Colloid Aggregation-Effect of Polymerization Rate," J. Mater. Sci. 29, 6123-30 (1994). A polymer induced colloidal aggregation technique is also described in U.S. Pat. No. 5,540,834, the contents of which are herein incorporated by reference.

Metal oxide catalysts used in embodiments of the invention can be sintered by heating them in a furnace or other heating device at a relatively high temperature. In some embodiments, the metal oxide is sintered at a temperature of about 160° C. or greater. In some embodiments, the metal oxide is sintered at a temperature of about 400° C. or greater. In some embodiments, the metal oxide is sintered at a temperature of about 600° C. or greater. Sintering can be done for various amounts of time depending on the desired effect. Sintering can make metal oxide catalysts more durable. In some embodiments, the metal oxide is sintered for more than about 30 minutes. In some embodiments, the metal oxide is sintered for more than about 3 hours. However, sintering also reduces the surface area. In some embodiments, the metal oxide is sintered for less than about 1 week.

In some embodiments, the metal oxide catalyst is in the form of particles. Particles within a desired size range can be specifically selected for use as a catalyst. For example, particles can be sorted by size using techniques such as air classification, elutriation, settling fractionation, or mechanical screening. In some embodiments, the size of the particles is greater than about 0.2 µm. In some embodiments, the size range selected is from about 0.2 µm to about 1 mm. In some embodiments, the size range selected is from about 1 µm to about 100 µm. In some embodiments, the size range selected is from about 5 µm to about 15 µm. In some embodiments, the average size selected is about 10 µm. In some embodiments, the average size selected is about 5 µm.

In some embodiments, metal oxide particles used with embodiments of the invention are porous. By way of example, in some embodiments the metal oxide particles can have an average pore size of about 30 angstroms to about 2000 angstroms. However, in other embodiments, metal oxide particles used are non-porous.

The physical properties of a porous metal oxide can be quantitatively described in various ways such as by surface area, pore volume, porosity, and pore diameter. In some embodiments, metal oxide catalysts of the invention can have a surface area of between about 1 and about 200 $m^2$/gram. Pore volume refers to the proportion of the total volume taken up by pores in a material per weight amount of the material. In some embodiments, metal oxide catalysts of the invention can have a pore volume of between about 0.01 $cm^3$/g and about 2 $cm^3$/g. Porosity refers to the proportion within a total volume that is taken up by pores. As such, if the total volume of a particle is 1 $cm^3$ and it has a porosity of 0.5, then the volume taken up by pores within the total volume is 0.5 $cm^3$. In some embodiments, metal oxide catalysts of the invention can have a porosity of between about 0 and about 0.8. In some embodiments, metal oxide catalysts of the invention can have a porosity of between about 0.3 and 0.6.

Metal oxide particles used with embodiments of the invention can have various shapes. By way of example, in some embodiments the metal oxide can be in the form of spherules. In other embodiments, the metal oxide can be a monolith. In some embodiments, the metal oxide can have an irregular shape.

The Lewis acid sites on metal oxides of the invention can interact with Lewis basic compounds. Thus, Lewis basic compounds can be bonded to the surface of metal oxides of the invention. Lewis basic compounds of the invention can include anions formed from the dissociation of acids such as hydrobromic acid, hydrochloric acid, hydroiodic acid, nitric acid, sulfuric acid, perchloric acid, boric acid, chloric acid, phosphoric acid, pyrophosphoric acid, chromic acid, permanganic acid, phytic acid and ethylenediamine tetramethyl phosphonic acid (EDTPA), and the like. Lewis basic compounds of the invention can also include hydroxide ion as formed from the dissociation of bases such as sodium hydroxide, potassium hydroxide, lithium hydroxide and the like.

The anion of an acid can be bonded to a metal oxide of the invention by refluxing the metal oxide in an acid solution. By way of example, metal oxide particles can be refluxed in a solution of sulfuric acid. Alternatively, the anion formed from dissociation of a base, such as the hydroxide ion formed from dissociation of sodium hydroxide, can be bonded to a metal oxide by refluxing in a base solution. By way of example, metal oxide particles can be refluxed in a solution of sodium hydroxide. The base or acid modification can be achieved under exposure to the acid or base in either batch or continuous flow conditions when disposed in a reactor housing at elevated temperature and pressure to speed up the adsorption/chemical reaction process. In some embodiments, fluoride ion, such as formed by the dissociation of sodium fluoride, can be bonded to the particles.

In some embodiments, metal oxide particles can be packed into a housing, such as a column. Disposing metal oxide particles in a housing is one approach to facilitating continuous flow processes. Many different techniques may be used for packing the metal oxide particles into a housing. The specific technique used may depend on factors such as the average particle size, the type of housing used, etc. Generally speaking, particles with an average size of about 1-20 microns can be packed under pressure and particles with an average size larger than 20 microns can be packed by dry-packing/tapping methods or by low pressure slurry packing. In some embodiments, the metal oxide particles of the invention can be impregnated into a membrane, such as a PTFE membrane.

However, in some embodiments, metal oxide catalysts used with embodiments of the invention are not in particulate form. For example, a layer of a metal oxide can be disposed on a substrate in order to form a catalyst used with embodiments of the invention. The substrate can be a surface that is configured to contact the feedstock during processing. In one approach, a metal oxide catalyst can be disposed as a layer over a surface of a reactor that contacts the feedstock. Alternatively, the metal oxide catalyst can be embedded as a particulate in the surface of an element that is configured to contact the feedstock during processing.

Reaction Conditions

In some embodiments, the reaction temperature is about 100° Celsius or hotter. In some embodiments, the reaction temperature is about 150° Celsius or hotter. In some embodiments, the reaction temperature is about 200° Celsius or higher. In some embodiments, the reaction temperature is about 300° Celsius or higher. In some embodiments, the reaction temperature is about 350° Celsius or higher. In some embodiments, the reaction temperature is above the critical temperature (e.g. supercritical) for at least some of the reactants. For example, the reaction temperature can be above the critical temperature for the alcohol and/or the pyrolysis oil.

The reaction mixture may be passed over the metal oxide catalyst for a length of time sufficient for the reaction to reach a desired level of completion. This will, in turn, depend on various factors including the temperature of the reaction, the chemical nature of the catalyst, the surface area of the catalyst, the contact time with the catalyst and the like. In an embodiment, the contact time is between about 0.1 seconds and 2 hours. In an embodiment, the contact time is between about 1 second and 20 minutes. In an embodiment, the contact time is between about 2 seconds and 1 minute.

In some embodiments, the reaction mixture is kept under pressure during the reaction in order to prevent components of the reaction mixture from vaporizing. The reactor housing can be configured to withstand the pressure under which the reaction mixture is kept. In addition, a backpressure regulator can be used to maintain a desired pressure. A desirable pressure for the reactor can be estimated with the aid of the Clausius-Clapeyron equation. Specifically, the Clausius-Clapeyron equation can be used to estimate the vapor pressures of a liquid. The Clausius-Clapeyron equation is as follows:

$$\ln\left(\frac{P_1}{P_2}\right) = \frac{\Delta H_{vap}}{R}\left(\frac{1}{T_2} - \frac{1}{T_1}\right)$$

wherein $\Delta H_{vap}$=is the enthalpy of vaporization; $P_1$ is the vapor pressure of a liquid at temperature $T_1$; $P_2$ is the vapor pressure of a liquid at temperature $T_2$, and R is the ideal gas constant.

In an embodiment, the pressure inside the housing is greater than the vapor pressures of any of the components of the reaction mixture. In an embodiment, the pressure is greater than about 500 psi. In an embodiment, the pressure is greater than about 800 psi. In an embodiment, the pressure is greater than about 1000 psi. In an embodiment, the pressure is greater than about 1500 psi. In an embodiment, the pressure is greater than about 2000 psi. In an embodiment, the pressure is greater than about 3000 psi. In an embodiment, the pressure is greater than about 3000 psi. In an embodiment, the pressure is greater than about 4000 psi. In an embodiment, the pressure is greater than about 5000 psi. In some embodiments, the pressure is above the critical pressure (e.g. supercritical) for at least some of the reactants. For example, the pressure can be above the critical pressure for the alcohol and/or the pyrolysis oil.

Alcohols

Exemplary alcohols used with embodiments herein can include aliphatic, aromatic, and alicyclic alcohols. In some embodiments, alcohols can include C1-C30 alcohols (alcohols with one to thirty carbon atoms). In some embodiments, alcohols can include C1-C6 alkyl alcohols. Alcohols used herein can be mono-functional or multi-functional (e.g., one alcohol moiety or multiple alcohol moieties). Exemplary alcohols can specifically include methanol, ethanol, propanol, isopropyl alcohol, butanol, ethylene glycol, benzyl alcohol and the like.

Alcohol feedstocks used with embodiments herein can include those formed through fermentation processes. By way of example, biomass can be fermented by microorganisms in order to produced alcohol feedstocks. Virtually any living organism is a potential source of biomass for use in fermentation processes. As such, alcohol feedstocks can be derived from industrial processing wastes, food processing wastes, mill wastes, municipal/urban wastes, forestry products and forestry wastes, agricultural products and agricultural wastes, amongst other sources. In some embodiments, alcohol feedstocks as used herein can be formed from biological wastes using processes such as those described in U.S. Pat. No. 7,309,592, the content of which is herein incorporated by reference in its entirety.

Pyrolysis of Biomass

It will be appreciated that there are various approaches for the pyrolysis of biomass. Pyrolysis is the chemical decomposition of organic materials by heating in the absence of oxygen or other reagents (other than water vapor in some cases). U.S. Pat. No. 4,891,459, the contents of which are herein incorporated by reference in their entirety, describes one basic exemplary approach for the pyrolysis of biomass. In general, biomass is disposed in a pyrolysis chamber, and then heat is provided by a heating element. The pyrolysis chamber is generally free of any oxygen gas. In some cases, the pyrolysis chamber is held under vacuum. In some embodiments, the pyrolysis chamber can be in selective fluid communication with a refining system, as described in greater detail below.

Another approach that can be used can be referred to as hydrothermal pyrolysis. In hydrothermal pyrolysis, biomass is converted into mixed gases (gas phase), char (solid phase), and bio-oil (liquid phase) after exposure to very high temperatures in the presence of water vapor, but in the absence of oxygen. As an example, in this approach, temperatures of roughly 300 degrees Celsius or higher can be used. In many cases, the biomass is processed into a particulate, such as through a grinding operation. In some cases, an acid or a base, such as potassium hydroxide is used as a reactant in this process. Advantages of this approach can include the ability to use non-dry biomass feedstock, relatively fast reaction rates, and no need for additional solvents.

Another approach to the pyrolysis of biomass is known as microwave assisted pyrolysis (MAP). MAP includes the input of microwave energy from a microwave radiation source to heat the biomass in a closed system lacking oxygen. Volatiles can then be collected using a condenser. Temperatures used in this process can be from about 200 degrees Celsius to over 1000 degrees Celsius. Advantages of this approach can include that the sample can be processed without grinding the sample. The use of microwave energy allows heating to be relatively fast and uniform, while maintaining a high degree of temperature control.

In various processes included herein, the bio-oil or pyrolysis oil produced by pyrolysis of biomass can be processed in various ways after the pyrolysis process. By way of example, in some embodiments, pyrolysis can be followed by centrifugation to remove water and particulates before further chemical refining.

Refining Systems

Figure 1A:
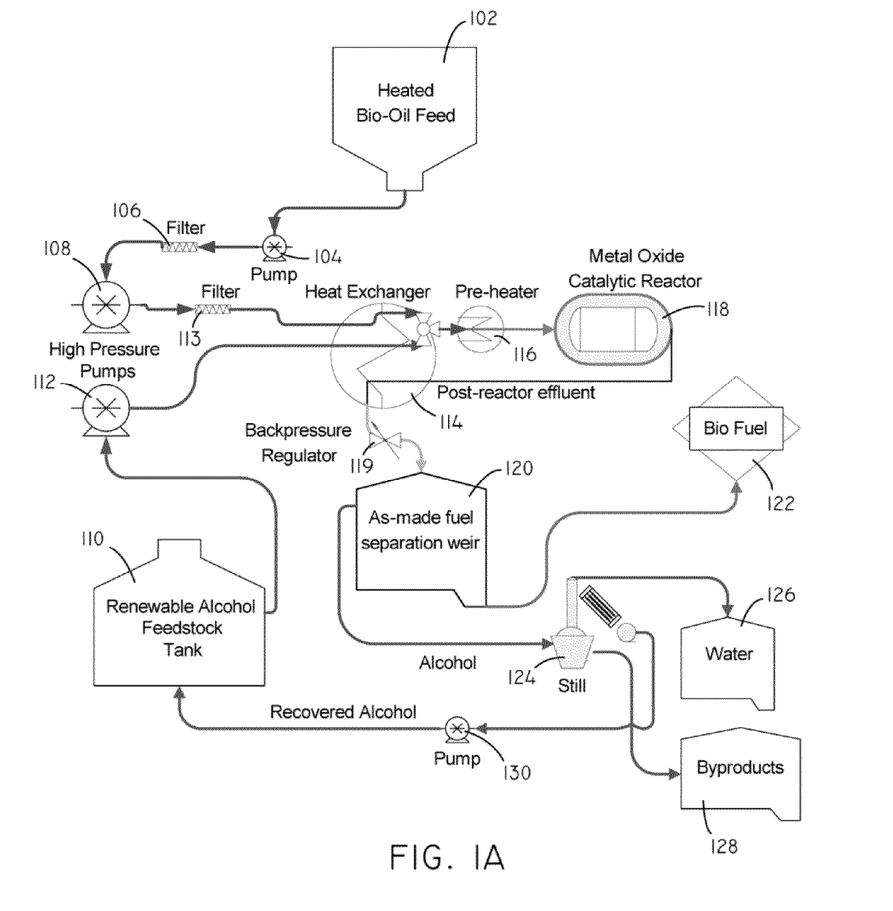
FIG. 1A is a schematic view of a reaction system in accordance with an embodiment.

It will be appreciated that many different reactor designs are possible in order to perform methods and processes as described herein. FIG. 1A is a schematic diagram of a refining system in accordance with one embodiment of the invention. In this embodiment, a bio-oil feedstock is held in a bio-oil feedstock tank 102. In some embodiments, the bio-oil may be processed in order to remove particulates and water before being deposited in the bio-oil feedstock tank 102. In this embodiment, an alcohol feedstock is held in an alcohol feedstock tank 110. In some embodiments, one or both of the bio-oil feedstock tank 102 and alcohol feedstock tank 110 can be heated.

The bio-oil feedstock passes through a first pump 104, first filter 106, second pump 108, and second filter 113, before passing through a heat exchanger 114 where the bio-oil feedstock can absorb heat from downstream products. Similarly, the alcohol feedstock then passes through a pump 112 before passing through the heat exchanger 114. An exemplary heat exchanger is described in U.S. Pat. No. 6,666,074, the content of which is herein incorporated by reference.

The feedstock streams can then pass through a preheater 116. The preheater 116 can elevate the temperature of the reaction mixture to a desired level. Many different types of heaters are known in the art and can be used.

The reaction mixture can then pass through a reactor 118 where the co-reactant feedstock and the bio-oil feedstock are converted into a reaction product mixture. The reactor 118 can include a metal oxide catalyst, such as in the various forms described herein. In some embodiments the reactor housing is a ceramic that can withstand elevated temperatures and pressures. In some embodiments, the reactor housing is a metal or an alloy of metals.

The reaction product mixture can then pass through the heat exchanger 114 in order to transfer heat from the effluent reaction product stream to the bio-oil and alcohol feedstock streams. The reaction product mixture can also pass through a backpressure regulator 119 before passing on to a separation weir 120. Diesel-equivalent fuel can then pass onto a fuel storage reservoir 122. Other materials, including residual alcohol, can pass on to a still 124 for further separation. Water can pass on to a water storage reservoir 126 while other byproducts can pass to a by-product reservoir 128. The now-purified residual alcohol can pass through a pump 130 and then back to the alcohol feedstock tank 110. In some embodiments, the diesel-equivalent fuel can be further processed. By way of example, in some embodiments, after leaving the separation weir the diesel-equivalent fuel can be processed in order to remove free fatty acids that may be present in the fuel. An exemplary system for removing free fatty acids from a fuel composition is described in US Publ. App. No. 2008/0197052, the content of which is herein incorporated by reference.

It will be appreciated that in some embodiments, certain of the components of the system described with reference to FIG. 1 may be omitted. In still other embodiments, certain additional components may be added. As such, the system of FIG. 1 is provided just as an example and it not intended to be limiting.

In some embodiments, the reaction mixture reaches the desired level of completion after one pass over the metal oxide catalyst bed or packing. However, in some embodiments, the effluent flow may be rerouted over the same metal oxide catalyst or routed over another metal oxide catalyst bed or packing so that reaction is pushed farther toward completion in stages.

In some embodiments two or more metal oxide catalyst beds. In some embodiments, an acid-modified metal oxide catalyst (such as sulfuric or phosphoric acid modified) and a base-modified metal oxide catalyst (such as sodium hydroxide modified) can be separately formed but then disposed together within a single reactor housing. In such an approach, the reaction mixture passing through the reactor housing can be simultaneously exposed to both the acid and base modified metal oxide catalysts.

In some embodiments, two different metal oxides (such zirconia and titania) can be separately formed but then disposed together within a single reactor housing. In such an approach, the reaction mixture passing through the reactor housing can be simultaneously exposed to both metal oxide catalysts.

In some embodiments, one or more metal oxides (such zirconia and titania) can be coated on an inert porous support (such as silica gel or zeolite) separately formed but then disposed together within a single reactor housing. In such an approach, the reaction mixture passing through the reactor housing can be simultaneously exposed to the metal oxide catalyst(s).

Figure 1B:
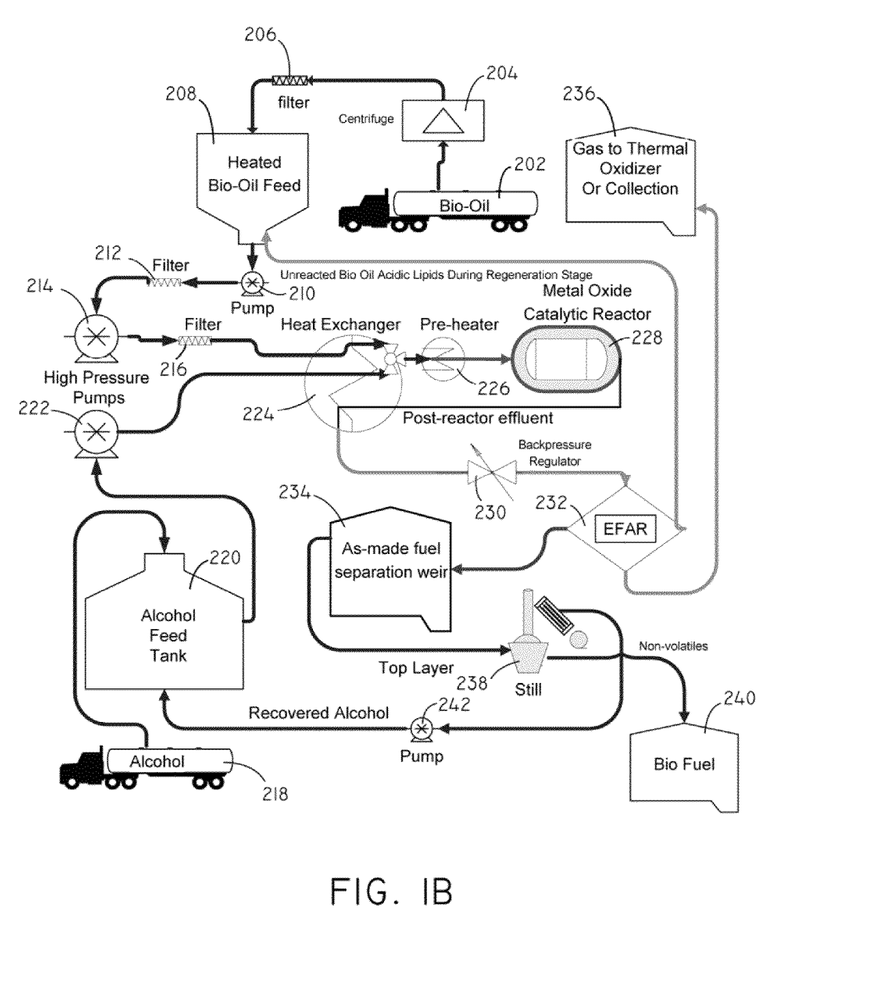
FIG. 1B is a schematic view of a reaction system in accordance with another embodiment.

FIG. 1B is a schematic diagram of a refining system in accordance with another embodiment of the invention. In this embodiment, a bio-oil feedstock may be obtained from a supply source 202 (or produced in accordance with approaches described above). Depending on the starting condition, the bio-oil feedstock can be passed through a centrifuge 204 in order to remove water and particulates that may be in the bio-oil, such as char. Then, the bio-oil feedstock can pass through a filter 206 and can then be held in a bio-oil feedstock tank 208. The bio-oil feedstock can then pass through a pump 210, through a filter 212, a high pressure pump 214, and through another filter 216 before entering a heat exchanger 224.

In this embodiment, an alcohol feedstock can be obtained from a supply source 218 and held in an alcohol feedstock tank 220. The alcohol feedstock can pass through a high pressure pump 222 before entering a heat exchanger 224.

In the heat exchanger 224, both the bio-oil feedstock and the alcohol feedstock can absorb heat from downstream products. The feedstock streams can be joined at a "T" junction and pass through a preheater 226 before entering a reactor 228 where the alcohol feedstock and the bio-oil feedstock are converted into a reaction product mixture. The reactor 228 can include a metal oxide catalyst, such as in the various forms described herein. In some embodiments the reactor housing is a ceramic that can withstand elevated temperatures and pressures. In some embodiments, the reactor housing is a metal or an alloy of metals.

The reaction product mixture can then pass through the heat exchanger 224 in order to transfer heat from the effluent reaction product stream to the bio-oil and alcohol feedstock streams. The reaction product mixture can then pass through a back pressure regulator 230. Next, the reaction product mixture can pass on to a system 232 for removing free fatty acids that may be present. An exemplary system for removing free fatty acids from a fuel composition is described in US Publ. App. No. 2008/0197052, the content of which is herein incorporated by reference. Alternatively, in some embodiments, the reaction mixture can pass through a flash evaporator for an initial separation of fuel from alcohol/water before the fuel fraction moves on to the system 232 for removing free fatty acids. Gases can pass to another component 236 for thermal oxidation or collection. The captured free fatty acids can be returned to the front-side of the reactor system, such as being deposited in the bio-oil feedstock tank 208.

The fuel mixture can pass on to a separation weir 234 and then the top layer can pass on to a still 238. The fuel fraction can then be collected in a tank 240, while the fraction including recovered alcohol can pass through a pump 242 before being collected in the alcohol feedstock tank 220. In some embodiments, the fuel fraction may continue on for further processing/refining. By way of example, the fuel fraction could pass through a distillation column to further separate out a desirable portion of the fuel fraction.

The present invention may be better understood with reference to the following examples. These examples are intended to be representative of specific embodiments of the invention, and are not intended as limiting the scope of the invention.

EXAMPLES

Example 1

Formation of Reactor Columns

Titania (80 micron, 300 Å) particles were obtained from ZirChrom Separations (Anoka, Minn.). Particles were packed at ZirChrom Separations (Anoka, Minn.) into reactor columns using a downward slurried high-pressure packing station (Alltech Associates, Deerfield, Ill.). The particles were packed into all-stainless steel column hardware obtained from Isolation Technologies (Hopedale, Mass.). The reactor was outfitted with 2-micron stainless steel frits.

Specifically, two reactor columns were prepared; the smaller had a dimension of 0.46 cm i.d.×15 cm length and the larger a dimension of 1.0 cm i.d.×15 cm length. A slurry was first formed by adding the zirconia particles to HPLC-grade methanol (7 g of particles in 20 g of MeOH or 23.5 g of particles in 40 g of MeOH for the small and large reactors, respectively). Reactor packing pressures of 7,000 PSI was used with methanol as the pusher solvent. The reactor was allowed to pack and compress for 30 or 2 minutes under pressure for the small and large reactors, respectively. The high pressure packing pump from Haskel (Burbank, Calif.) was then shut off and the reactor was allowed to slowly bleed off pressure while remaining attached to the packing apparatus. When the pressure had been fully released, the column was disconnected from the apparatus and the frit and end fitting were attached to the inlet to complete construction of the reactor.

Example 2

Refining System Design

Specifically, one high pressure Waters 590 HPLC pump (obtained from Waters Corporation, Milford, Mass.) was set up to draw from a reservoir that included bio-oil diluted with an alcohol that was continuously sparged with nitrogen to minimize the effect of dissolved oxygen on the system. The system was set up so that the bio-oil/alcohol solution would be pumped through a stainless steel (1 cm i.d.×15 cm long) tube fitted with two 2 micron stainless steel frits (acting as a filter) before it entered the heat exchanger.

The bio-oil/ethanol solution stream was pumped into a custom designed heat exchanger that consists of welding together two ⅛th inch o.d. stainless steel tubes (Alltech Associates, Deerfield, Ill.) with silver solder where the heat from the hot effluent from the reactor is exchanged with the one incoming reactant stream (bio-oil ethanol solution). After the heat exchanger the one reactant stream passed through an electrically driven preheater that was capable of bringing the mixture to the desired set point temperature before entering the independently thermostated fixed bed catalytic reactor (reactor column from example 1). Temperature control was achieved using EZ-Zone PM Watlow (St. Louis, Mo.) temperature controllers. The custom preheater was used to bring the temperature of the flowing fluid up to the desired temperature before it entered the reactor, which consisted of wound stainless steel HPLC tubing in a grooved aluminum cylindrical block with an 800 watt Watlow heater in the center of the cylinder. The backpressure of the system was maintained through the use of a backpressure regulator obtained from Tescom (Elk River, Minn.).

Example 3

Synthesis of Diesel Equivalent Fuel from Pyrolysis Oil (Bio-Oil)

A sample of bio-oil (pyrolysis oil) formed from corn stover using a microwave assisted pyrolysis technique was obtained. The bio-oil was first dissolved in an organic solvent (e.g. ethanol, hexane) to lower the viscosity and ethanol was also used as a reactant. The bio-oil feedstock was then centrifuged at 10,000 G for 6 minutes and then filtered through a 5 micron membrane filter. The residence time was held constant at 2 minutes and the reaction temperature was set to either 300 or 350 degrees Celsius.

Samples of the products produced at both temperatures were then taken and the remaining reaction products were subjected to distillation through rotary evaporation. The fractions were as shown in Table 1.

TABLE 1

| | ID | Description |
| --- | --- | --- |
| 300° C. Celsius Fractions | 300-1 | Crude undistilled product fraction. |
| | 300-2 | First distillate to be collected by rotary evaporation of crude product. |
| | 300-3 | Second distillate to be collected by rotary evaporation of crude product. |
| | 300-4 | Portion remaining in flask after rotary evaporation. |
| 350° C. Celsius Fractions | 350-1 | Crude undistilled product fraction. |
| | 350-2 | First distillate to be collected by rotary evaporation of crude product. |
| | 350-3 | Second distillate to be collected by rotary evaporation of crude product. |

TABLE 1-continued

| ID | Description |
|---|---|
| 350-4 | Portion remaining in flask after rotary evaporation. |

The fractions were then analyzed using both $^1$H NMR and GC-MS. Specifically fractions 300-2, 300-3, 300-4, 350-2, 350-3, and 350-4 were analyzed using $^1$H NMR. For $^1$H NMR, samples were dissolved in CDCl$_3$ and $^1$H NMR spectra were acquired on a Varian-Inova spectrometer at 300 MHz. Samples were internally referenced with TMS.

Figure 2:
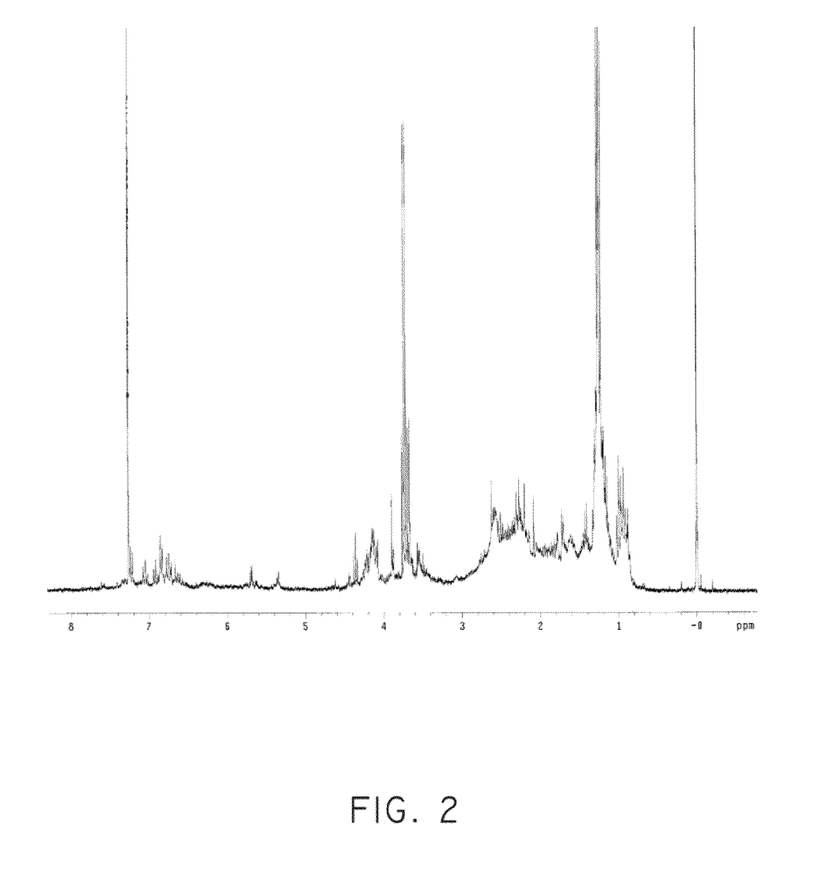
FIG. 2 shows a $^1$H NMR spectrum of a sample made as described in example 3.
Figure 3:
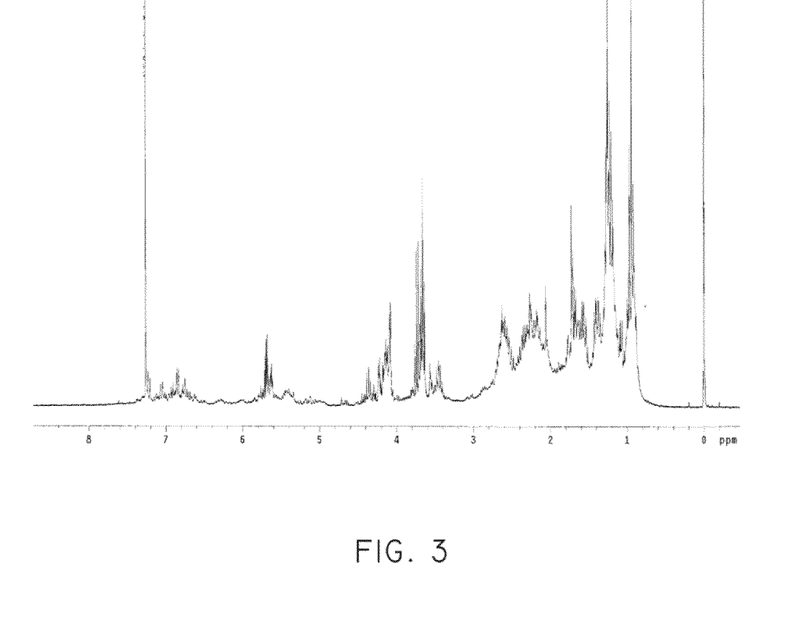
FIG. 3 shows a $^1$H NMR spectrum of another sample made as described in example 3.

$^1$H NMR analysis showed that fraction 300-2 consisted mostly of ethanol with other compounds present believed to be diethyl ether, acetaldehyde and ethyl acetate. Fraction 300-3 was also found to consist mostly of ethanol with another compound being present exhibiting a chemical shift consistent with an allylic alcohol. Fraction 300-4 was found to be complex mixture of compounds, with the 6-7.5 ppm region containing peaks consistent with aromatic resonances (phenols), the 5-6 ppm region containing peaks consistent with internal olefins, the 3.5-4.5 region containing peaks consistent with alcohols, esters, allylic alcohols, and ethers, and the 0.8-3.0 ppm region containing peaks consistent with alkyl groups. Fraction 350-2 consisted mostly of ethanol with other compounds present believed to be diethyl ether, acetaldehyde and ethyl acetate. Fraction 350-3 was also found to consist mostly of ethanol with another compound believed to be 2-buten-1-ol and another allylic alcohol. Fraction 350-4 was found to be complex mixture of compounds, with the 6-7.5 ppm region containing peaks consistent with aromatic resonances (phenols), the 5-6 ppm region containing peaks consistent with internal olefins, the 3.5-4.5 region containing peaks consistent with alcohols, esters, allylic alcohols, and ethers, and the 0.8-3.0 ppm region containing peaks consistent with alkyl groups. FIG. 2 shows the $^1$H NMR spectrum for fraction 300-4. FIG. 3 shows the $^1$H NMR spectrum for fraction 350-4.

Fractions 300-1, 300-4, 350-1, and 350-4 were analyzed using GC-MS. For GC-MS samples were analyzed on an HP6890 GC-MS using MS detection and a DB-5 column (30 m×0.25 mm×0.25 um). Various specific temperature programs and injection volumes were used. For 300-1 and 350-1, flow rate was 0.5 ml/min, temp. program: 35° C. for 2 min, increase to 45° C. at 2° C./min, increase to 120° C. at 5° C./min, increase to 220° C. at 20° C./min, increase to 310° C. at 5° C./min and hold for 2 min, MS detector cutoff range set to 48-800, total run time of 47 minutes. 1 μL injection volume for 300-1 and 2 μL injection volume for 350-1.

Figure 4:
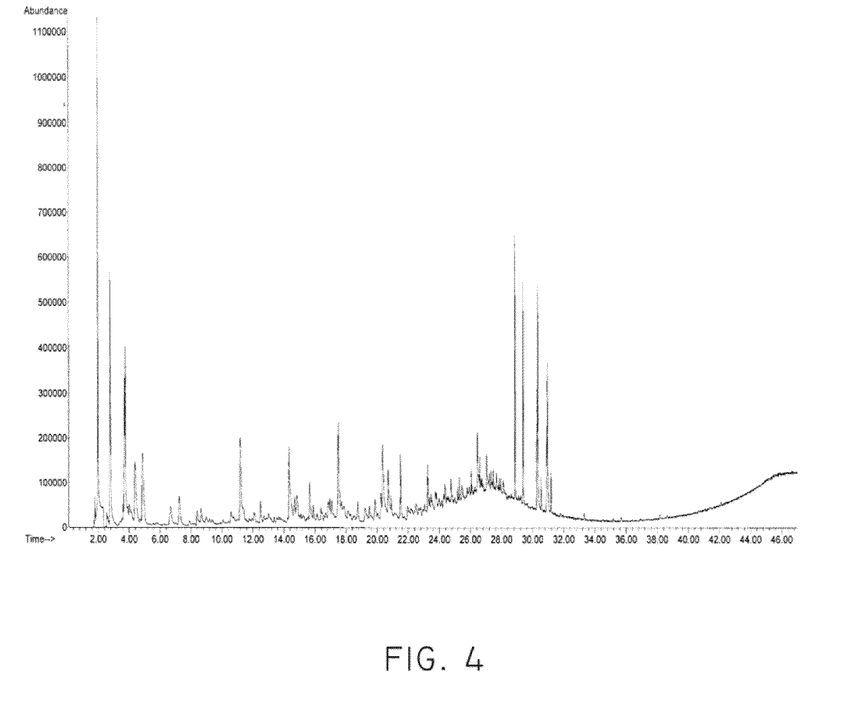
FIG. 4 shows a GC-MS spectrum of a sample made as described in example 3.

Analysis of 300-1 using GC-MS showed a variety of peaks. FIG. 4 shows the GC-MS spectrum for this sample. Major peaks in the spectra were labeled with the highest probability MS hit obtained from the NIST library. The identified compounds are shown below in Table 2. Compounds of particular interest are the variety of esters that are formed, including esters that are commonly associated with triglyceride derived bio-diesel samples.

Figure 5:
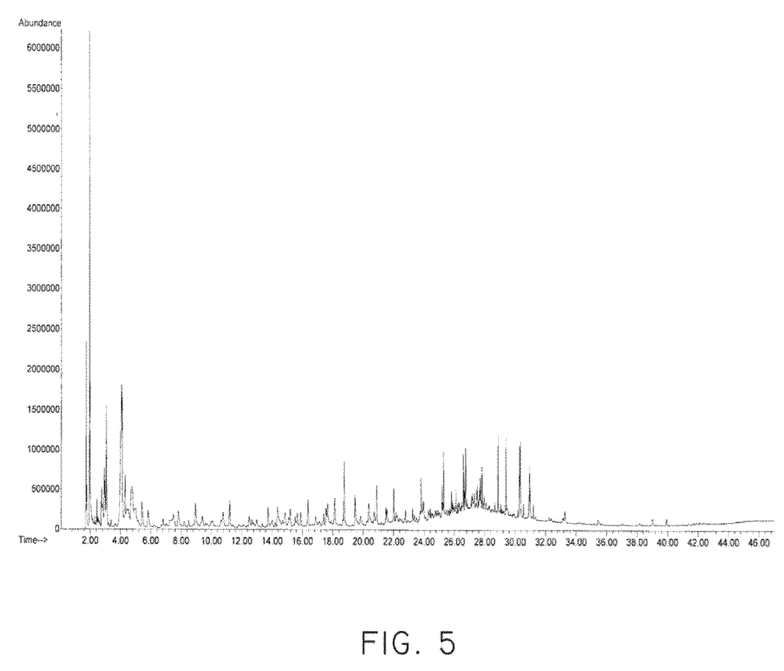
FIG. 5 shows a GC-MS spectrum of a sample made as described in example 3.

Analysis of 350-1 using GC-MS also showed a variety of peaks, but an increase in the number of compounds versus 300-1. FIG. 5 shows the GC-MS spectrum for this sample. The identified compounds are shown below in Table 2. There appears to be an increase in the number of alcohols and aromatic compounds formed. Also, the relative intensity of the long chain esters appears to have diminished accompanied by the appearance of some shorter chain esters.

TABLE 2

| 300-1 | | 350-1 | |
|---|---|---|---|
| RT | NIST compound | RT | NIST compound |
| 1.98 | diethyl ether | 1.729 | methylenecyclopropane |
| 2.769 | ethyl acetate | 1.953 | diethyl ether |
| 3.687 | 2-buten-1-ol | 2.448 | hexane |
| 3.747 | 2-buten-1-ol | 2.754 | ethyl acetate |
| 4.379 | ethyl propionate | 2.936 | 3-ethoxy-1-butene |
| 4.887 | acetal | 2.98 | 2-methylen-4-penten-1-ol |
| 7.29 | ethyl butanoate | 3.069 | 3-buten-1-ol |
| 8.67 | 2-methylcyclopentanone | 4.062 | 3-hydroxypivalaldehyde |
| 11.18 | 2-methyl-2-cyclopentenone | 4.116 | 2-buten-1-ol |
| 14.322 | phenol | 4.763 | trans-1-ethoxy-1-butene |
| 17.499 | 1,6-heptadien-4-ol | 4.944 | acetal |
| 20.341 | 4-ethylphenol | 5.413 | 3-methyl-1,5-heptadiene |
| 21.487 | diethyl methylsuccinate | 5.813 | (5Z)-3-methyl-1,5-heptadiene |
| 23.25 | diethyl pentanedioate | 6.826 | cyclopentanol |
| 28.868 | methyl palmitate | 7.819 | 2,6-octadiene |
| 29.391 | ethyl palmitate | 8.964 | 3,4-dimethylcyclohexanol |
| 30.29 | ethyl 8,11-octadecadienoate | 9.413 | 3-propyl-2,4-pentadien-1-ol |
| 30.334 | methyl 10-octadecenoate | 10.782 | 3-methyl-5-hexen-1-ol |
| 30.905 | ethyl linoleate | 11.216 | ethyl pentanoate |
| 30.95 | ethyl oleate | 13.747 | 1-allylcyclopropanecarboxylic acid |
| 31.2 | ethyl stearate | 14.355 | phenol |
| | | 15.2 | ethyl-3-hexenoate |
| | | 16.365 | ethyl-2-hexenoate |
| | | 16.873 | 3-cyclohex-1-ethyl-prop-2-enal |
| | | 17.395 | 2-ethyl-cycloheptanone |
| | | 18.13 | tetrahydro-4-methyl-1-pyran-2-one |
| | | 18.755 | 4-ethyl-4-methyl-2-cyclohexenone |
| | | 19.47 | o-ethylphenol |
| | | 20.36 | p-ethylphenol |
| | | 20.71 | ethyl succinate |
| | | 20.886 | 1-(2,2-dimethyl[1,3]dioxan-4-yl)ethanol |
| | | 21.491 | diethyl methylsuccinate |
| | | 22.017 | dimethyl 2-methoxy-2-butendioate |

TABLE 2-continued

| 300-1 | | 350-1 | |
|---|---|---|---|
| RT | NIST compound | RT | NIST compound |
| | | 22.776 | 2,5-diethylphenol |
| | | 23.246 | diethyl pentandioate |
| | | 25.291 | propofol |
| | | 26.597 | 3,5-di-tert-butylphenol |
| | | 26.738 | 2-tert-butyl-1,4-dimethoxy-benzene |
| | | 27.832 | 2,6-di-tert-butyl hydroquinone |
| | | 28.871 | methyl 14-methyl-pentadecanoate |
| | | 29.392 | ethyl palmitate |
| | | 30.292 | ethyl 8,11-octadecadienoate |
| | | 30.336 | methyl 10-octadecenoate |
| | | 30.907 | ethyl linoleate |
| | | 30.951 | ethyl oleate |
| | | 31.18 | ethyl stearate |

Figure 6A:
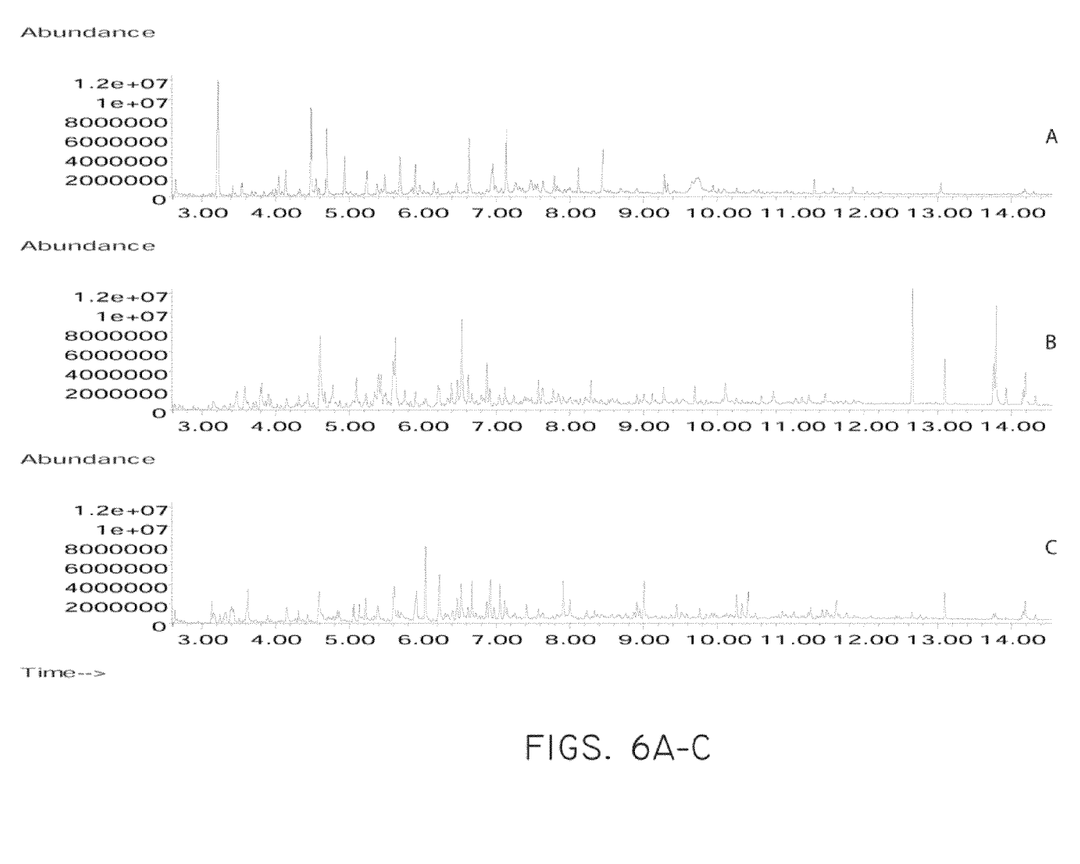
FIG. 6A is a graph showing the results of GC-MS analysis of a bio-oil control sample.

FIGS. 6A-C shows the results of a GC-MS analysis of the original bio-oil (FIG. 6A) versus fractions 300-4 and 350-4 (FIGS. 6B-C) that were collected and distilled to remove solvents (hexane) and unreacted ethanol after the bio-oil was subjected to the reaction process at two temperatures (300° C. and 350° C.). Specifically, FIG. 6B represents the chromatogram obtained for fraction 300-4, while FIG. 6C represents the chromatogram obtained for fraction 350-4.

Comparison of the chromatograms suggests significant chemical differences in the resulting compounds. FIG. 6A shows that pyrolysis oil has fewer peaks compared to the number of compounds observed in the samples subjected to the metal oxide reactor. The GC column (HP-5) use for these separations is commonly used to separate organic compounds by their boiling points, with later eluting compounds having higher boiling points. Thus the fewer observed peaks in the original bio-oil sample is likely caused by very high boiling compounds in bio-oils that would be highly retained on the column and which likely do not elute under the chromatographic conditions employed. As can be seen in FIG. 6B, there are more observable peaks present in the chromatogram, especially at longer retention times. Furthermore, FIG. 6C shows that elevated reactor temperature reduces the number of more highly retained products.

The MS data indicated that many of the longer retained peaks in the GC run were esters. These results suggest that many of the constituents of the bio-oil underwent esterification. Furthermore, the results suggest that these esters further react to form lower boiling point (lower mass molecules) at higher temperature and some peaks are reduced in area and additional peaks appear at lower retention times. It is believed that the constituents of the bio-oil primarily undergo esterification and etherification dehydration reactions to produce a new mixture of lower boiling (and less viscous) compounds.

The acid number of the products obtained was tested in accordance with ASTM 664 and was found to be much lower than the original bio-oil. The original sample had an acid number of 112 and the two samples at lower (300° C.) and higher (350° C.) temperatures had acid numbers of 13 and 15, respectively. The results confirm that the acids in the bio-oil have been esterified thus leading to the decrease in acid number.

In addition, the viscosity of the sample was found to be reduced (a major limitation of the original pyrolysis bio-oil produced from corn stover).

Thus, this example shows that: (1) diesel-equivalent fuel can be produced from bio-oil through a reaction catalyzed by a metal oxide, (2) reaction temperature has a significant effect on the products that are formed in the reaction between bio-oil and organic alcohols, and (3) reaction products produced have a lower acid number and viscosity than bio-oil.

The invention has been described with reference to various specific and preferred embodiments and techniques. However, it should be understood that many variations and modifications may be made while remaining within the spirit and scope of the invention.

All publications and patents mentioned herein are hereby incorporated by reference in their entirety. The publications and patents disclosed herein are provided solely for their disclosure. Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A method of producing a diesel-equivalent fuel, comprising:
pyrolyzing lignocellulosic biomass to form a pyrolysis oil;
removing char from the pyrolysis oil;
obtaining an alcohol from an alcohol feedstock tank and mixing the alcohol with the pyrolysis oil to form a pyrolysis oil and alcohol mixture; and
esterifying the pyrolysis oil by contacting the pyrolysis oil and alcohol mixture with a metal oxide catalyst at a temperature of greater than about 60 degrees Celsius to form the diesel-equivalent fuel.

2. The method of claim 1, further comprising removing water from the pyrolysis oil prior to the step of contacting the pyrolysis oil and alcohol mixture with the metal oxide catalyst.

3. The method of claim 1, further comprising removing free fatty acids from diesel-equivalent fuel by binding the free fatty acids to a metal oxide substrate.

4. The method of claim 1, the metal oxide catalyst selected from the group consisting of alumina, hafnia, titania, and zirconia, and mixtures thereof.

5. The method of claim 1, the temperature greater than about 100 degrees Celsius.

6. The method of claim 1, the temperature greater than about 200 degrees Celsius.

7. The method of claim 1, the temperature greater than about 300 degrees Celsius.

8. The method of claim 1, the temperature greater than about 350 degrees Celsius.

9. The method of claim 1, the alcohol comprising a C1-C30 alcohol.

10. The method of claim 1, the alcohol comprising ethanol.

11. The method of claim 1, wherein pyrolyzing biomass to form the pyrolysis oil includes applying microwave radiation to the biomass.

12. The method of claim 1, wherein pyrolyzing biomass to form the pyrolysis oil includes applying microwave radiation to the biomass under vacuum distillation.

13. The method of claim 1, wherein the biomass comprises corn stover.

14. The method of claim 1, wherein contacting the pyrolysis oil and an alcohol with a metal oxide catalyst results in reducing the acid number from greater than 100 to less than 20.

15. The method of claim 1, wherein contacting the pyrolysis oil and an alcohol with a metal oxide catalyst is conducted at a supercritical temperature and pressure for the alcohol.

16. The method of claim 1, wherein esterifying the pyrolysis oil by contacting the pyrolysis oil and alcohol mixture with a metal oxide catalyst comprising passing the pyrolysis oil and alcohol mixture through a packed particulate catalyst in a reactor column.

* * * * *